US009891801B2

(12) United States Patent
Roesch et al.

(10) Patent No.: US 9,891,801 B2
(45) Date of Patent: Feb. 13, 2018

(54) VISUALIZATION AND NAVIGATION FOR MULTI-DIMENSIONAL HIERARCHICAL DATA

(71) Applicants: Philipp Roesch, Dresden (DE); Axel Schroeder, Dresden (DE)

(72) Inventors: Philipp Roesch, Dresden (DE); Axel Schroeder, Dresden (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 14/275,126

(22) Filed: May 12, 2014

(65) Prior Publication Data

US 2015/0324101 A1    Nov. 12, 2015

(51) Int. Cl.
*G06F 3/0487*   (2013.01)
*G06F 3/0484*   (2013.01)
*G06F 17/30*    (2006.01)
*G06T 11/00*    (2006.01)

(52) U.S. Cl.
CPC ...... *G06F 3/04847* (2013.01); *G06F 3/04842* (2013.01); *G06F 17/30554* (2013.01); *G06F 17/30572* (2013.01); *G06F 17/30592* (2013.01); *G06T 11/00* (2013.01)

(58) Field of Classification Search
CPC ............. G06F 3/04842; G06F 3/04847; G06F 17/30554; G06F 17/30572; G06F 17/30592; G06F 17/30286–17/30607; G06F 17/30696; G06F 17/30991; G06F 17/30946–17/30961; G06F 17/30994; G06F 17/30651; G06F 17/30716; G06F 17/30719; G06F 17/30941; G06F 17/30958; G06F 17/30973; G06F 3/0481–3/0483; G06T 11/206
See application file for complete search history.

(56) References Cited

U.S. PATENT DOCUMENTS

| | | |
|---|---|---|
| 6,211,887 B1 | 4/2001 | Meier et al. |
| 6,509,898 B2 | 1/2003 | Chi et al. |
| 6,529,900 B1 | 3/2003 | Patterson et al. |

(Continued)

OTHER PUBLICATIONS

Ankerst et al. "'Circle Segments': A Technique for Visually Exploring Large Multidimensional Data Sets." *Proc. Visualization '96. Hot Topic Session.* San Francisco, CA. 1996.Web. May 12, 2014.

(Continued)

*Primary Examiner* — Jennifer To
*Assistant Examiner* — Liang Li
(74) *Attorney, Agent, or Firm* — Mintz Levin Cohn Ferris Glovsky and Popeo, P.C.

(57) ABSTRACT

Data is received that includes a multi-dimensional data set having data at different hierarchy levels. Using the received data, a first view of a chart having a branch corresponding to each dimension within the data set is rendered in a graphical user interface. Each branch extends outwardly from a center point and has graphical indicators corresponding to each corresponding hierarchy level. The hierarchy levels are arranged in order such that a highest hierarchy level is closest to the center point and a lowest hierarchy level is closest to or at a termination point of the corresponding branch. Related apparatus, systems, techniques and articles are also described.

19 Claims, 13 Drawing Sheets

(56) References Cited

U.S. PATENT DOCUMENTS

| | | |
|---|---|---|
| 7,268,782 B2 | 9/2007 | Ebert |
| 7,657,416 B1 | 2/2010 | Subasic et al. |
| 8,176,096 B2 | 5/2012 | Allyn et al. |
| 8,301,585 B2 | 10/2012 | Mourey et al. |
| 9,239,672 B2* | 1/2016 | Kraut .................. G06F 3/0488 |
| 9,342,217 B2* | 5/2016 | Geithner .............. G06F 3/0482 |
| 2006/0112070 A1 | 5/2006 | Ramos |
| 2008/0307369 A1* | 12/2008 | Liu ...................... G06T 11/206 715/855 |
| 2009/0058857 A1* | 3/2009 | Ballantyne ........... G06T 11/206 345/440 |
| 2009/0319931 A1 | 12/2009 | Hutchings et al. |
| 2010/0231595 A1 | 9/2010 | Dang et al. |
| 2012/0102396 A1 | 4/2012 | Arksey et al. |
| 2012/0159359 A1 | 6/2012 | Ehrler et al. |
| 2012/0240064 A1* | 9/2012 | Ramsay ................ G06T 11/00 715/762 |
| 2013/0055146 A1 | 2/2013 | Armitage |
| 2013/0106830 A1* | 5/2013 | de Loera ............. G06T 11/206 345/419 |
| 2013/0207980 A1 | 8/2013 | Ankisettipalli et al. |
| 2014/0062897 A1* | 3/2014 | Muller ................. G06F 17/246 345/173 |
| 2014/0095972 A1* | 4/2014 | Molesky .............. G06F 17/211 715/227 |

OTHER PUBLICATIONS

Kotsis, N., Weir, G., Ferguson, J., & MacGregor, D. (2002). Novel data visualisation and exploration in multidimensional datasets. In *Enterprise Information Systems III* (pp. 90-96). Kluwer Academic.

Mansmann, Svetlana, and Marc H. Scholl. (2006). "Extending Visual OLAP for Handling Irregular Dimensional Hierarchies." A Min Tjoa and J. Trujillo (Eds.): DaWaK 2006. LNCS 4081. pp. 95-105.

Mansmann, Svetlana, and Marc H. Scholl. (2008) "Visual OLAP: A New Paradigm for Exploring Multidimensional Aggregates." *IADIS International Conference Computer Graphics and Visualization* 2008. pp. 59-66.

Stasko, John. "An evaluation of space-filling information visualizations for depicting hierarchical structures." *Int. J. Human-Computer Studies*.vol. No. 53. (2000). 663-694.

* cited by examiner

100

| Time | Customer name | Customer city | Customer nation | Customer region | Customer size | Customer type | Product name | Product category | Product group | Supplier name | Supplier city | Supplier nation | Supplier region | Price | Qty |
|------|---------------|---------------|-----------------|-----------------|---------------|---------------|--------------|------------------|---------------|---------------|---------------|-----------------|-----------------|-------|-----|
| 2012/07/14 | ABC Inc. | Berlin | Germany | Europe | SME | Level A | MyMP3 | Audio | Electronic | Super Electronics | Hamburg | Germany | Europe | 5000 | 100 |
| 2012/07/15 | The book store | Chicago | USA | North America | LE | Power | Un-broken | History | Books | Publisher Corp. | London | Great Britain | Europe | 1200 | 200 |
| 2012/07/15 | The book store | Chicago | USA | North America | LE | Power | The Amateur | History | Books | Publisher Corp. | London | Great Britain | Europe | 500 | 50 |
| 2012/07/15 | La Librairie | Paris | France | Europe | SME | Level B | Killing Lincoln | History | Books | Publisher Corp. | London | Great Britain | Europe | 60 | 10 |
| 2012/07/15 | The Audio store | San Francisco | USA | North America | LE | Critical | MyMP3 | Audio | Electronic | Super Electronics | Hamburg | Germany | Europe | 15000 | 300 |
|  |  |  |  |  |  |  |  |  |  |  |  |  |  |  |  |

FIG. 1

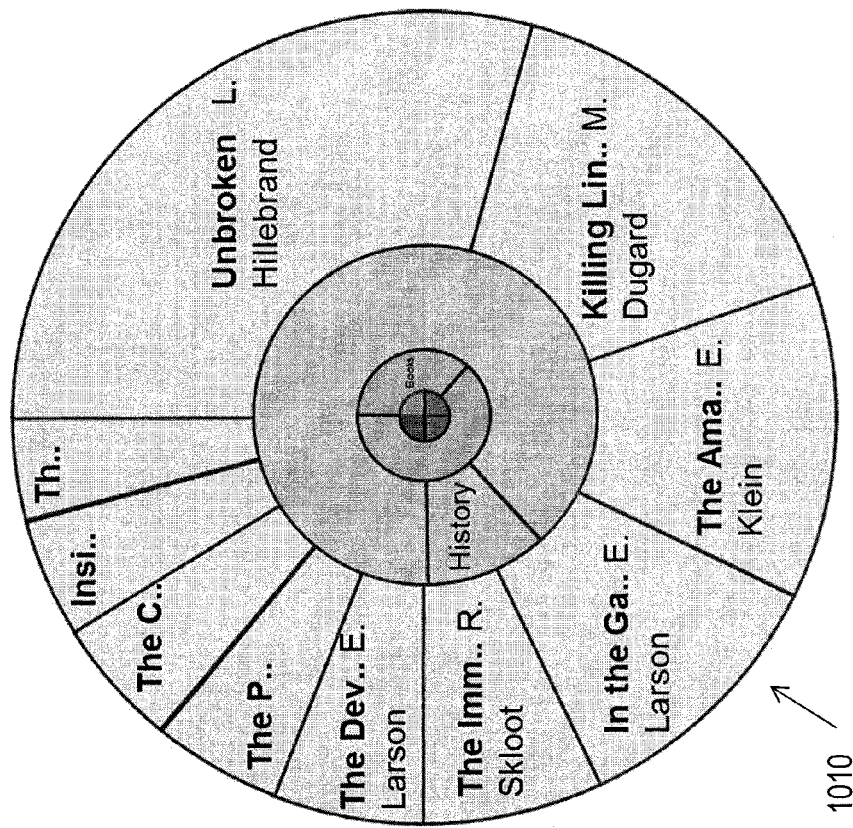
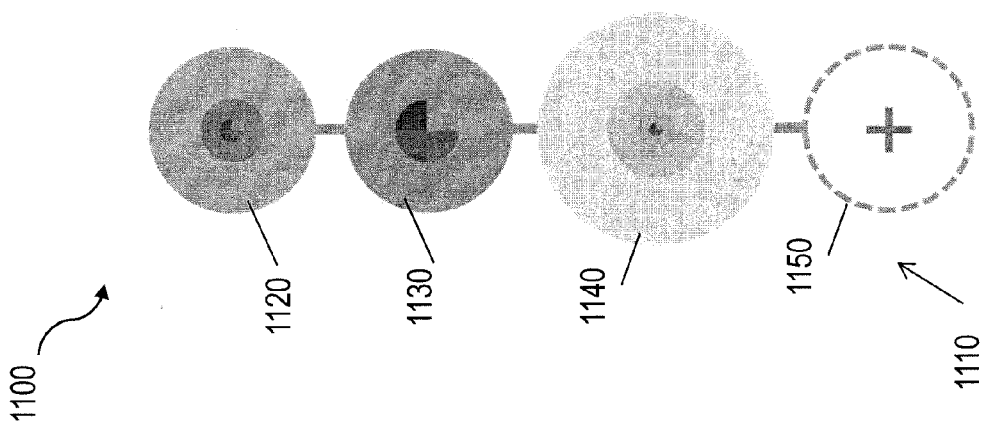
FIG. 11

VISUALIZATION AND NAVIGATION FOR MULTI-DIMENSIONAL HIERARCHICAL DATA

TECHNICAL FIELD

The subject matter described herein relates to techniques for intuitively visualizing and navigation multi-dimensional hierarchical data.

BACKGROUND

Companies are generating data at ever increasing rates which, in turn, makes data analysis an increasingly complex task. To reveal and benefit from information hidden in their data, analysts require easy to use tools. Challenges arise from the complexity of the data; typically, it is multi-dimensional and structured in complex hierarchies. One common representation of these types of structures is the use of data cubes. However, it is difficult for users to consider more than three dimensions. Additionally, non-linear hierarchies, such as time hierarchies, cannot be easily represented in such data cubes. As a consequence, analysts still need an appropriate representation for getting a quick overview of existing dimensions and their hierarchical structure.

In addition, analysts not only have to understand the structure of the data, they also need to navigate to different levels in the individual dimensions. As a result, data analysis tools require support for easy and fast navigation. Typically, navigation is accomplished using roll up and drill-down operations.

SUMMARY

Data is received that includes a multi-dimensional data set having data at different hierarchy levels. Using the received data, a first view of a chart having a branch corresponding to each dimension within the data set is rendered in a graphical user interface. Each branch extends outwardly from a center point and has graphical indicators corresponding to each corresponding hierarchy level. The hierarchy levels are arranged in order such that a highest hierarchy level is closest to the center point and a lowest hierarchy level is closest to or at a termination point of the corresponding branch.

The following describes variations that can be implemented singly or in combination. At least one dimension can include two distinct and non-overlapping hierarchy sections and can be represented by separate branches corresponding to the non-overlapping hierarchy sections which are joined at an overlapping hierarchy section.

The first view can include an "all" node centered on the center point and connecting each branch at an all hierarchy level. At least a portion of the graphical indicators can have a corresponding graphical user interface element which, when activated, causes a second view of the chart, different from the first view of the chart, to be rendered in the graphical user interface. A first view of a second chart can be rendered in the graphical user interface that corresponds to one or more measures of interest as specified by the activated graphical user interface elements. The first chart can be displayed adjacent to the second chart in the graphical user interface.

Graphical indicators corresponding to a particular branch can be illustrated in a distinctive manner as compared to graphical indicators corresponding to other branches. For example, different colors, shading, and the like can be used. In addition, graphical indicators can include text labels that correspond to hierarchy levels.

A third view of the chart can be rendered, in the graphical user interface, that includes at least one collapsed branch that, in turn, has a corresponding graphical user interface element which, when activated, causes the at least one collapsed branch to expand.

A dimension selector can be rendered in the graphical user interface that includes a plurality of segments corresponding to dimensions of the data set. Each segment can have a corresponding graphical user interface element which, when activated, initiates filtering along the corresponding dimension. The dimension selector can include hierarchically nested segments (e.g., concentric circles/segmented circles, etc.). The hierarchically nested segments can be based on filtering at two or more hierarchy levels. The hierarchically nested segments can be based on filtering at two or more hierarchy levels including a level higher than a current hierarchy filtering level.

A dimension selection panel can be rendered in the graphical user interface which comprises one or more dimension selector preview elements. The dimension selector preview elements has corresponding graphical user interface element which, when activated, cause a corresponding dimension selector to be displayed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter can improve and simplify the analysis of complex structured data by providing (1) a hierarchy visualization that supports multiple dimensions and complex hierarchies, (2) an easy to use navigation within the visualization of dimensions and hierarchies, and (3) a dimension and hierarchy visualization that allows a user to filter while navigating through the data and concurrently visualizing a measure of interest.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is a diagram illustrating a sample data set;

FIG. 11 is a diagram illustrating a dimension selection panel concurrent with the dimension selector of FIG. 10;

Like reference symbols in the various drawings indicate like elements.

DETAILED DESCRIPTION

The following describes methods, systems, and computer program products for intuitive visualization and navigation for multi-dimensional hierarchical data. Various examples are described below and it will be appreciated that they provide illustrations of the innovations described herein and are not intended to be limiting. As part of these examples, a data set comprising sales data is used (see diagram 100 of FIG. 1). In particular, provided in diagram 100 are sales data with four dimensions (time, customer, product, and supplier) and two key figures (price and quantity). In some variations, the dimensions can be color-coded and or otherwise made visually distinctive using, for example, shading and the like. For example, a first color can represent a time dimension, a second color can represent the customer dimension, a third color can represent the product dimension, and a fourth color can represent the supplier dimension.

Figure 2:
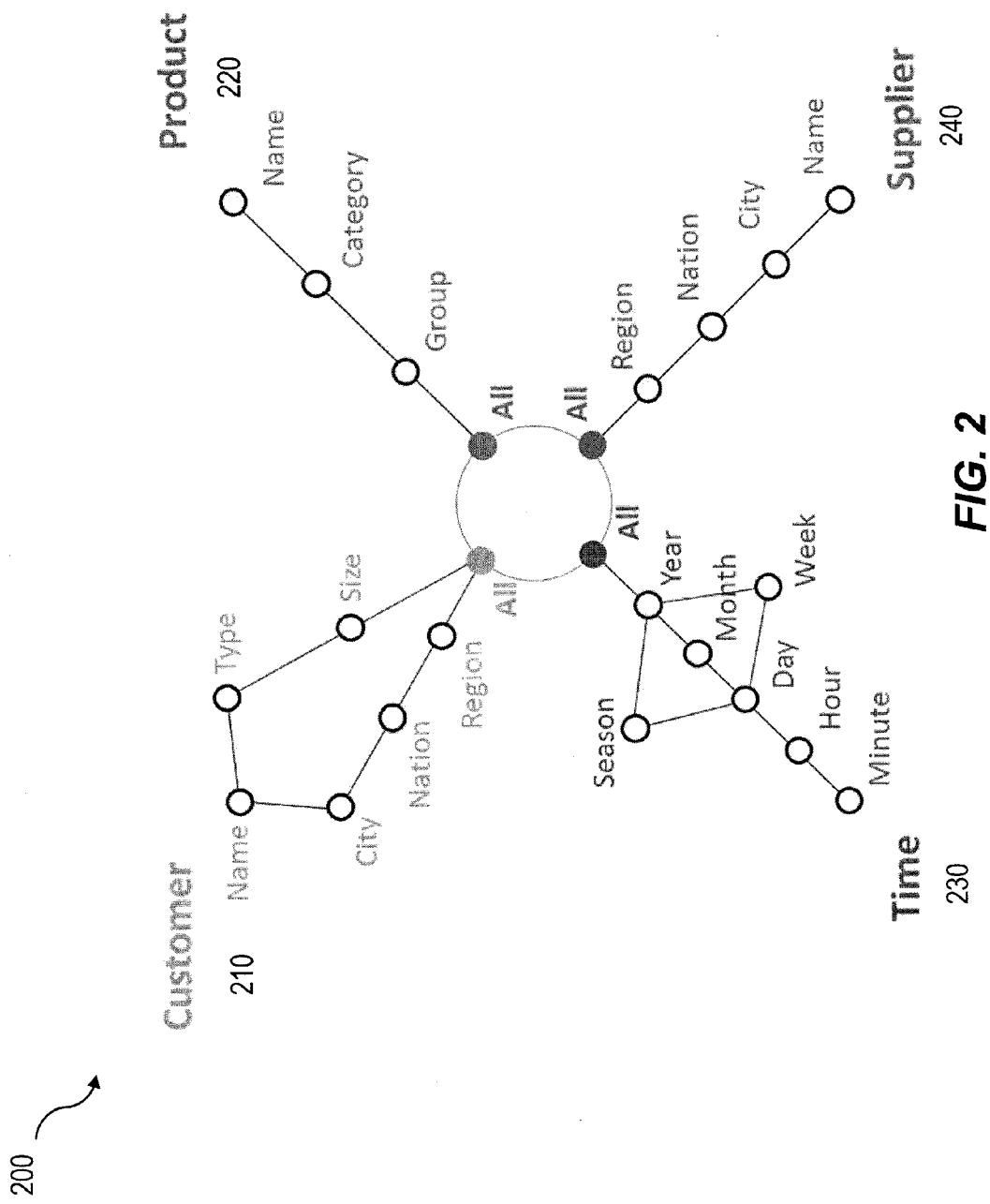
FIG. 2 is a diagram illustrating a visualization of multiple dimensions and complex hierarchies.

Various visualizations are described and illustrated herein that provide views of multiple dimensions and complex hierarchies. FIG. 2 illustrates a visualization 200 derived from the dataset of FIG. 1 that has four dimensions 210, 220, 230, 240 that are fan-shaped and which all start and extend outwards from an 'All' node. Such a visualization 200 can, as described in further detail below, be rendered in a graphical user interface having numerous GUI elements to allow the corresponding dataset to be navigated using similar style visualization. In this example, the product dimension 220 and supplier dimension are represented simply as branches while the customer dimension 210 and the time dimension 230 have branched and/or parallel paths (i.e., the customer and time dimensions 210, 230 are not simply linear dimensions).

Figure 3:
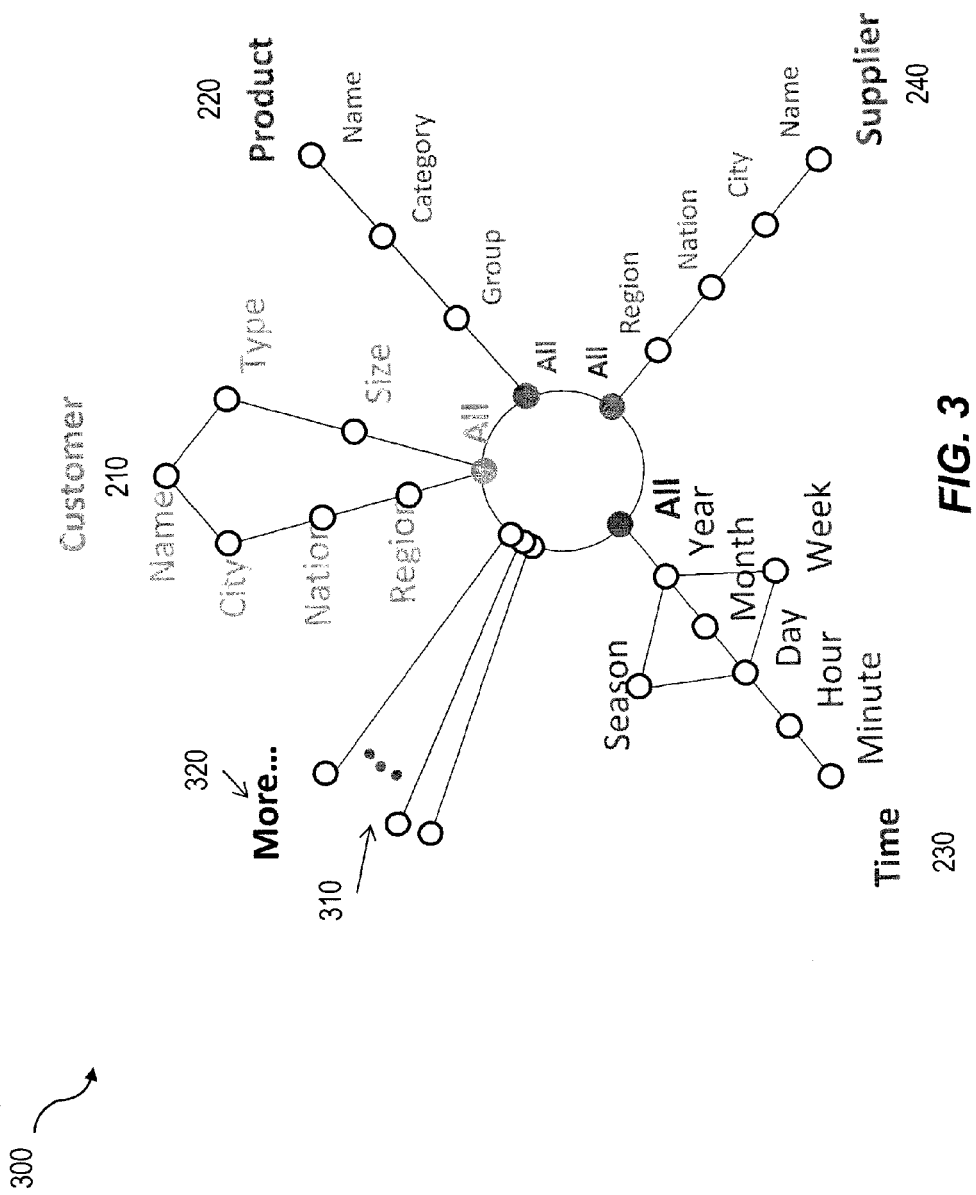
FIG. 3 is a diagram illustrating dynamic visualization for high-dimensional data sets.

FIG. 3 illustrates a visualization 300 in which only a subset of the dimensions for the dataset are displayed. The remaining dimensions can be collapsed or otherwise reduced/obscured/hidden (see region 310). Such an arrangement can be adopted when the number of dimensions is so large that they cannot be concurrently rendered as branches (or at least such branches cannot be rendered without sacrificing the usability of the visualization). A graphical user interface element 320 (in this example having associated text MORE) can be activated which causes one or more of the collapsed branches to be rendered. In some cases, one or more of the other branches is then collapsed.

Figure 4:
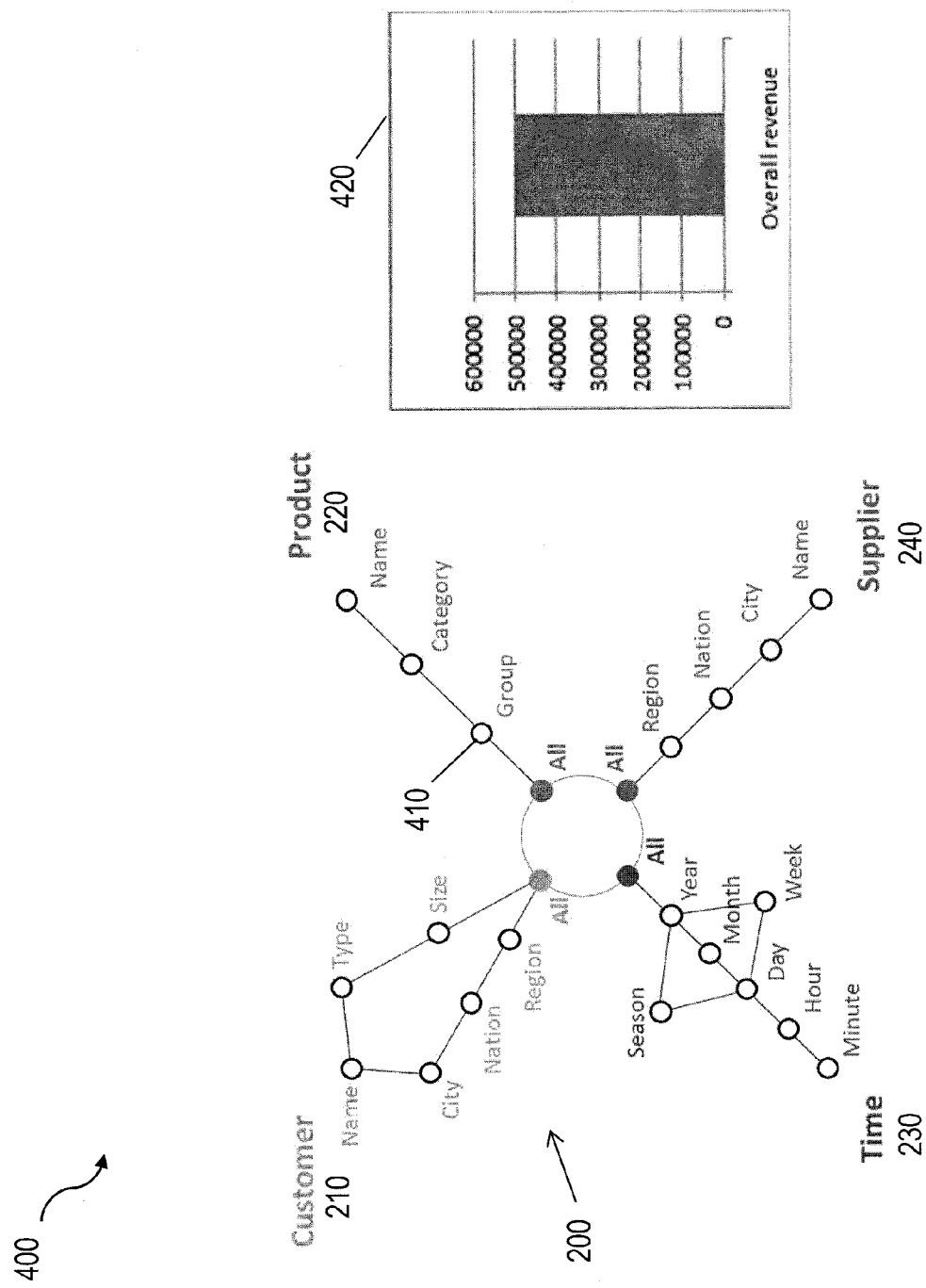
FIG. 4 is a diagram illustrating a visualization with hierarchy navigation at an initial stage.

As stated above, visualizations 200, 300 can have graphical user interface elements corresponding to each level to allow a user to navigate at desired levels in the various dimensions of the data set. With reference to diagram 400 of FIG. 4, for example, along the product dimension 220 of visualization 200, there can be a level associated with group and there can be an associated graphical user interface element 410 which, when activated via user-generated input (e.g., clicking, tapping, etc), results in navigation to such level (i.e., drill down into the product dimension to the group level). In particular, FIG. 4 shows an initial representation in which all selectable level indicators are at the ALL level. Furthermore, in some variations, a chart 420 can be concurrently displayed with the visualization that is based on the navigation; in this case such chart 420 is a bar chart showing an aggregated price measure. For linear hierarchies, a user can only select one level at a time; for complex hierarchies, the analyst can select multiple levels at parallel paths.

Figure 5:
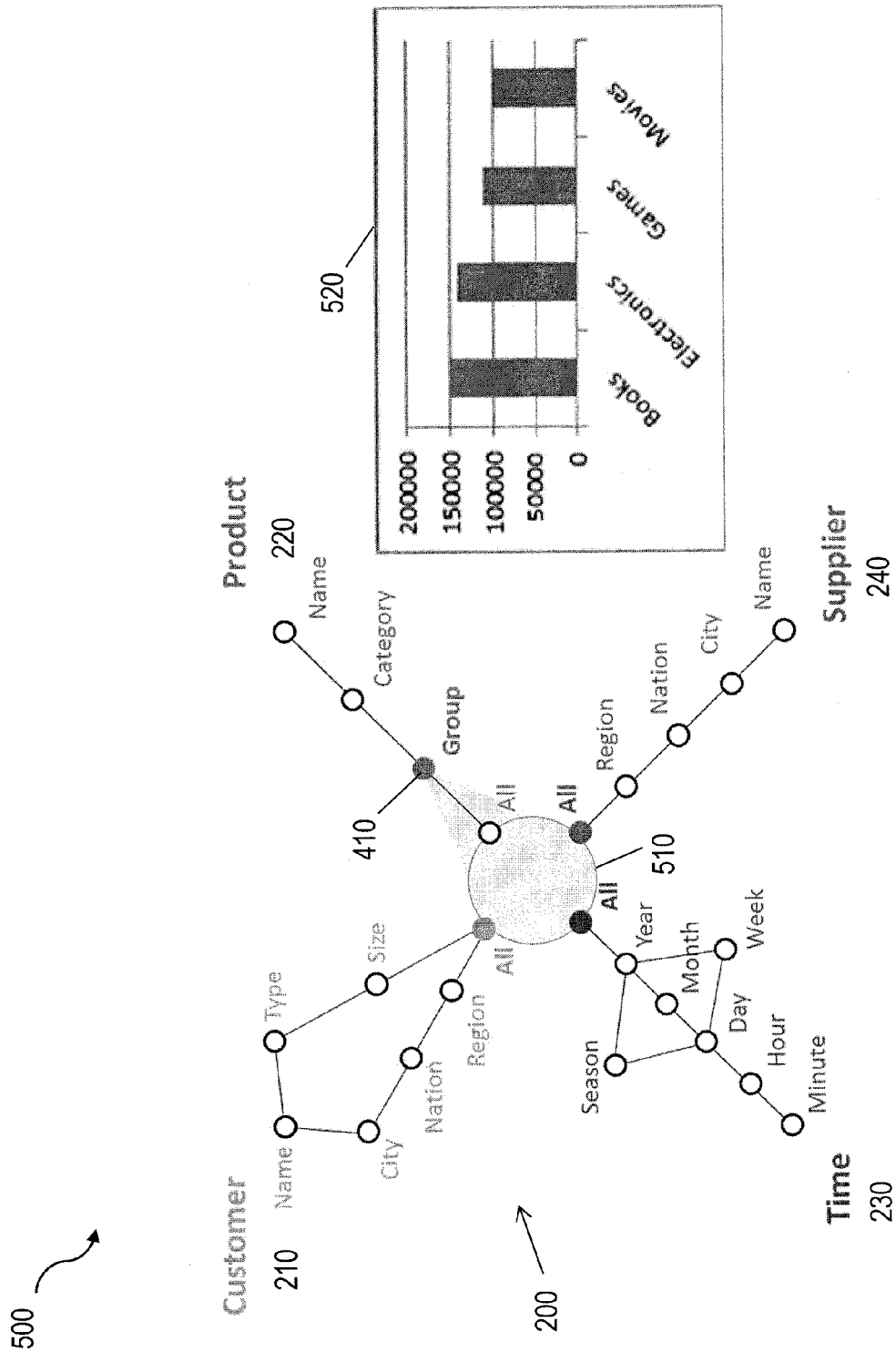
FIG. 5 is a diagram illustrating a visualization of hierarchy navigation by drilling down into a product dimension.

Additionally, with reference to diagram 500 of FIG. 5, in some variations, all of the level indicators that have graphical user elements that have been activated can be connected and the resulting shape (see 510) can be filled with color or texture. This shape provides a quick overview of all the currently selected levels in the different dimensions. FIG. 5 also can include a chart 520 that is concurrently displayed with the visualization that is based on the navigation (in this case showing revenue per product group).

Figure 6:
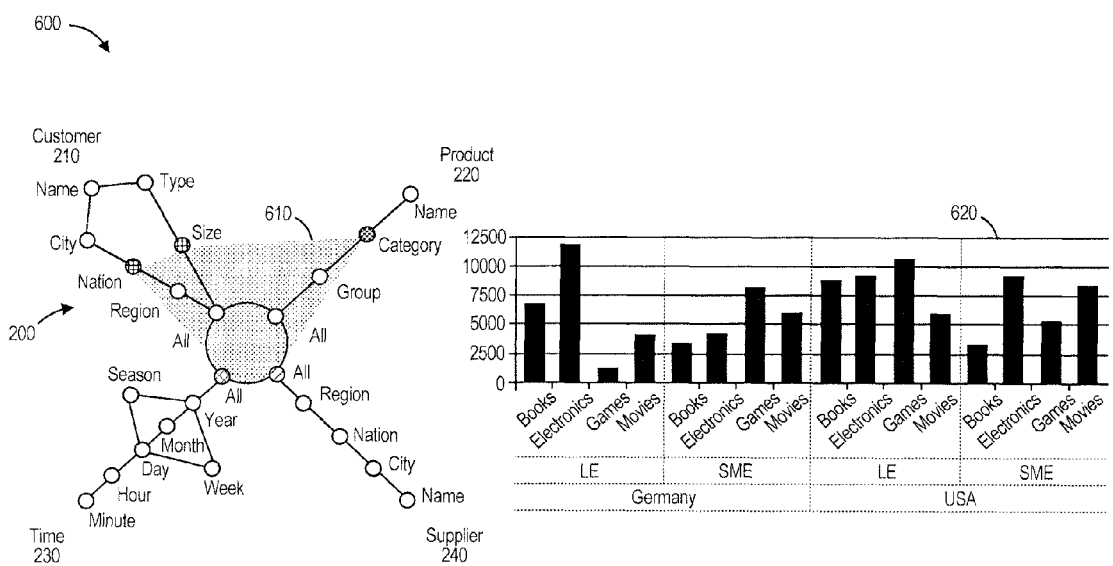
FIG. 6 is a diagram illustrating a visualization of hierarchy navigation by drilling down into product and customer dimensions.

FIG. 6 is a diagram 600 that shows the representation of navigating to the product category level of the product dimension and to both customer nation and customer size in the customer dimension (as represented by shaded portion 610). In addition, a corresponding bar chart 620 can be concurrently displayed in some variations that shows a further drill down in the product and customer dimensions corresponding to the shaded portion 610.

It will be appreciated that the approach described above allows for fast navigation and an analysis for all the instances of the currently selected levels, like all product types for all customer nations. Often, the analysts (i.e., the end users) also want to filter for specific dimension attribute values like specific nations or product types. Below is described an approach to hierarchically drill down to the level of interest by selecting the item of interest at each level. The interaction is analogous to navigating to a target directory in a file system while the visualization and the displayed information are rather different.

In the current approach, a graphical element such as a circle can be rendered in a graphical user interface such that it initially displays all the dimensions and later all the instances of the current hierarchy level of the selected dimension. While drilling down the circles of the higher levels are displayed in a reduced size in the center of the main circle; additionally, the selected item is highlighted. This provides both a quick overview of the currently selected hierarchy path and a means to quickly roll up the hierarchy again.

By using a circle, one can combine the hierarchical data filtering with a simultaneous representation of the measure of interest. This can be realized by designing the circle as a pie chart, that is, the segment size of each instance corresponds to the value of the measure for that instance. The actual value of the measure for a segment is displayed on demand, e.g., by clicking on the corresponding segment. Changing the measure of interest can be realized in a separate menu showing all the available measures.

Figure 7:
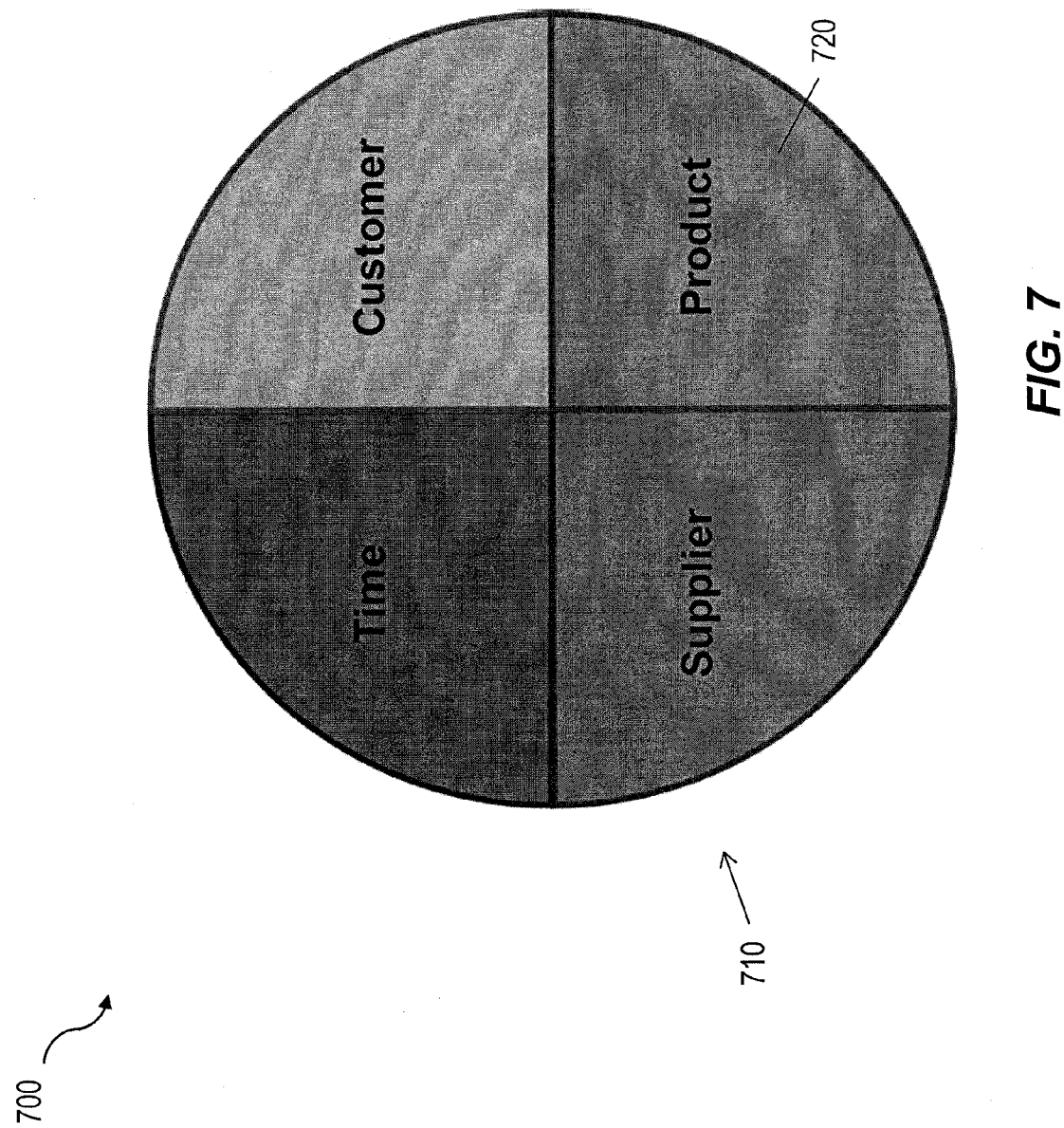
FIG. 7 is a diagram illustrating a first view of a dimension selector.
Figure 8:
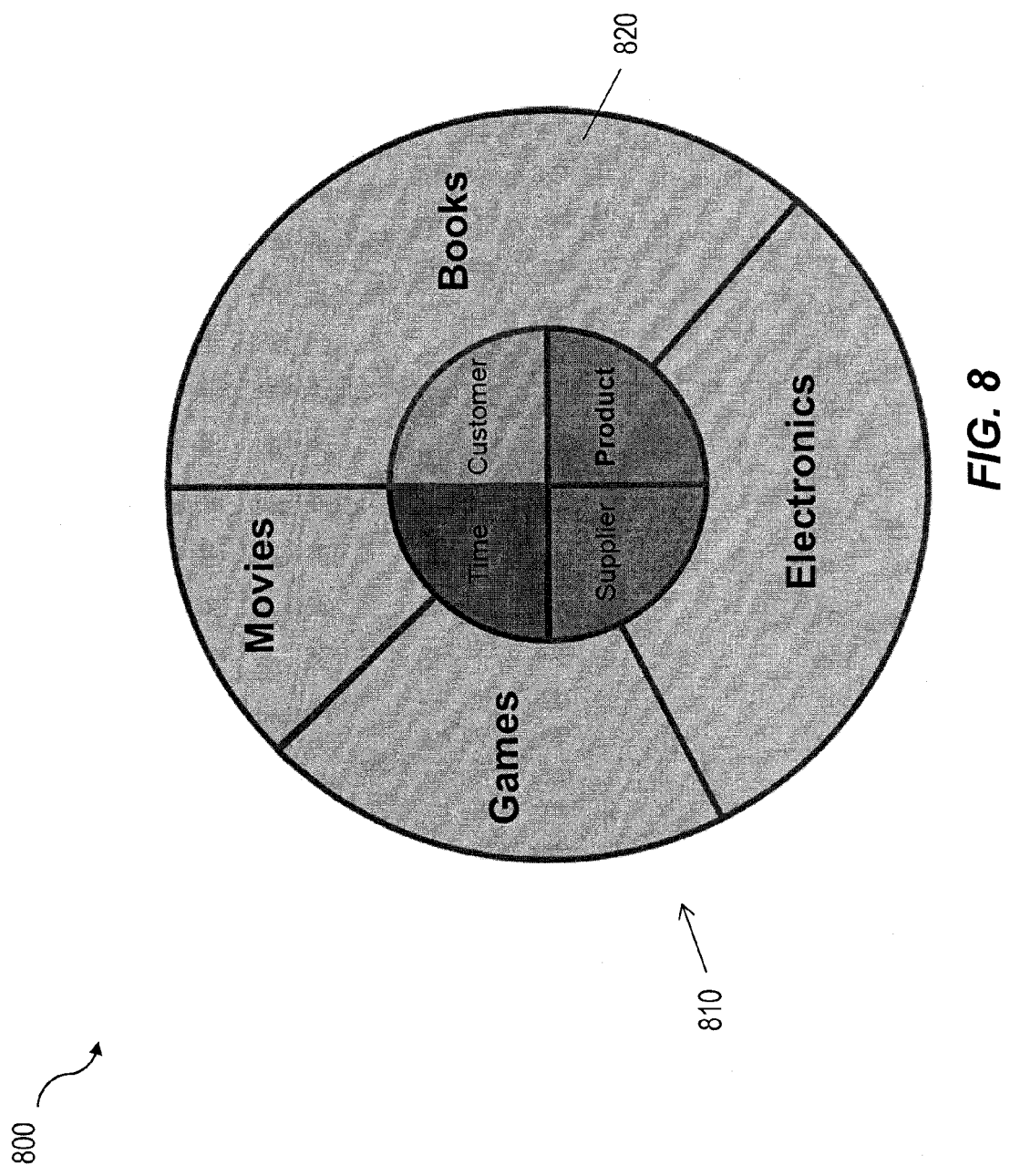
FIG. 8 is a diagram illustrating a second view of the dimension selector after hierarchical filtering into a product dimension.
Figure 9:
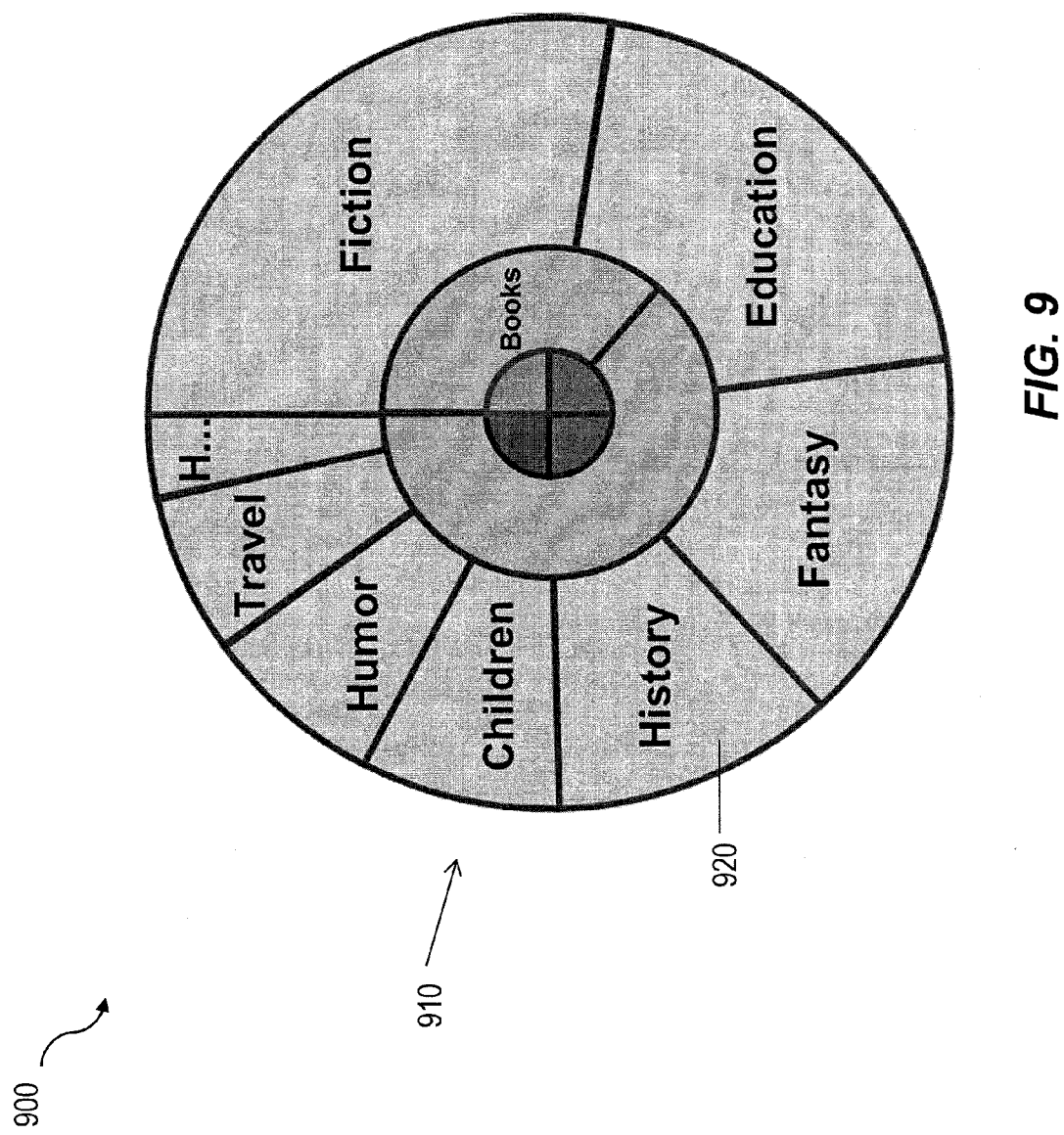
FIG. 9 is a diagram illustrating a third view of the dimension selector after hierarchical filtering at a book level.
Figure 10:
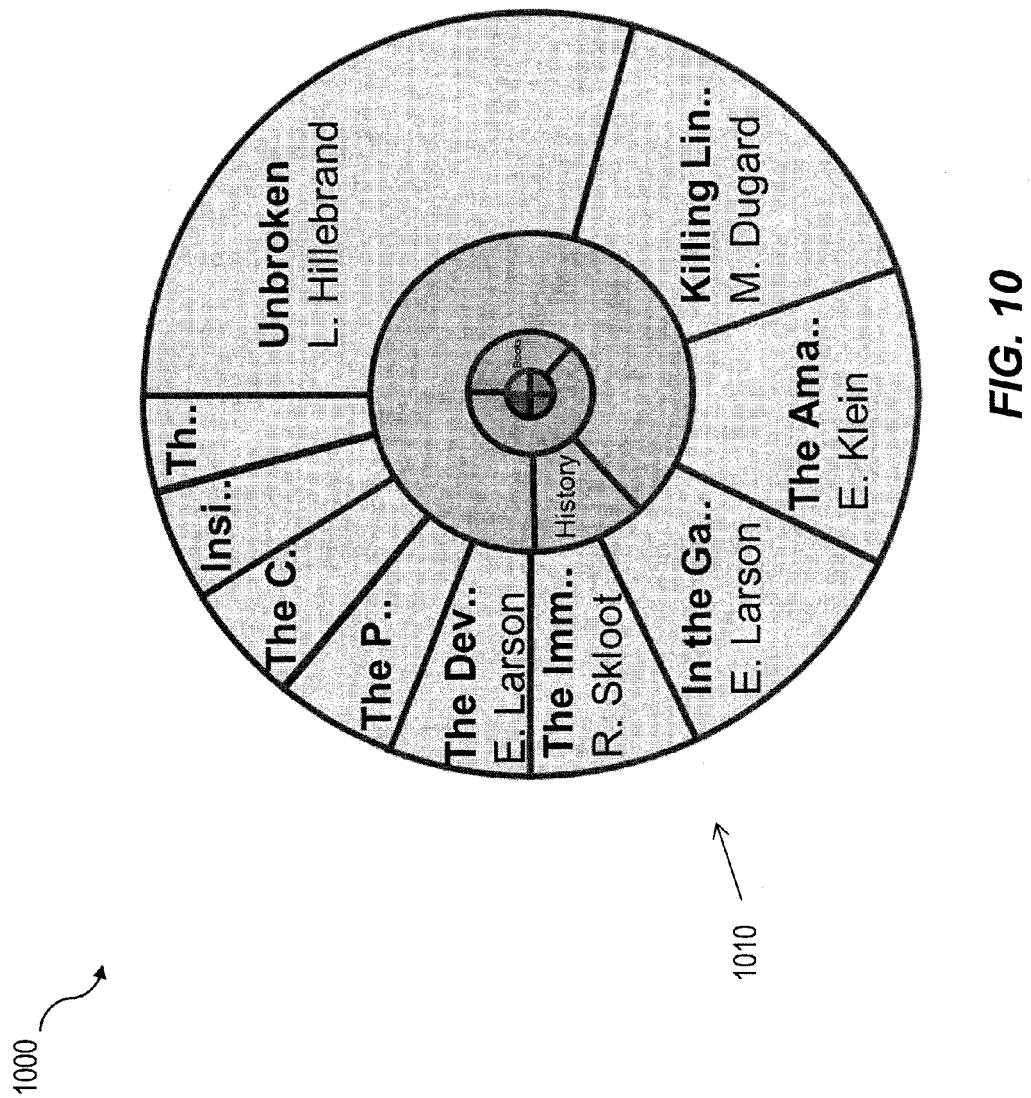
FIG. 10 is a diagram illustrating a fourth view of the dimension selector after hierarchical filtering at a historical book level.

FIG. 7 is a diagram 700 that includes a circle 710 that shows the dimension selection with our circular layout. Each dimension can have a corresponding graphical user interface element which when activated results in a drill down along the corresponding dimension. After activating a graphical user interface element 720 associated with the product dimension, the view changes to the circle 810 displayed in diagram 800 of FIG. 8 showing all the available product groups. The segment sizes correspond to the revenue—the measure of interest—in each of the product groups. Subsequent filtering for books at product group level (by activating a graphical user interface element 820) and historical books (by activating a graphical user interface element 920) at product type level changes the view to views 910, 1010 as displayed in FIGS. 9 and 10, respectively.

With reference to diagram 1100 of FIG. 11, in some variations, hierarchical filtering can be expanded using a dimension selection panel 1110. This dimension selection panel 1110 can display the dimensions that are already used for filtering by small icons in the respective color (or other visually distinctive manner)—see elements 1120, 1130, 1140. Additionally, the dimension selection panel 1110 can allow the analyst to add further dimensions for filtering. Hence, with this dimension selection panel 1110, the analyst can easily switch between dimensions using any of elements 1120-1140 or alternatively add a new dimension using element 1150 for hierarchical filtering.

Assume that in the running example, the analyst already did some hierarchical filtering in the time and supplier dimension and is currently filtering in the product dimension. For this scenario, diagram 1100 of FIG. 11 shows the extended hierarchical filtering visualization 1010 including the dimension selection panel 1110. Here, the currently focused dimension is displayed on the right (in visualization 1010), while its corresponding visual representation 1140 within the panel on the left is slightly enlarged (other techniques can be used to show which of the elements 1120-1140 correspond to the currently displayed visualization). By using the '+' symbol in the element 1150 at the bottom of the dimension selection panel 1110 the analyst can additionally filter in the customer dimension.

For linear hierarchies the hierarchical filtering is as intuitive and familiar as the navigation in a file system. More complex hierarchies can require the analyst to specify the navigation path. To allow such specification in an easy to use way, a hierarchy path selection dialog can be displayed when drilling down into a non-linear hierarchy. By selecting the segment to drill into, this segment can be extended by all the possible drill down paths. After selecting the path of choice the representation and navigation is as usual.

Figure 12:
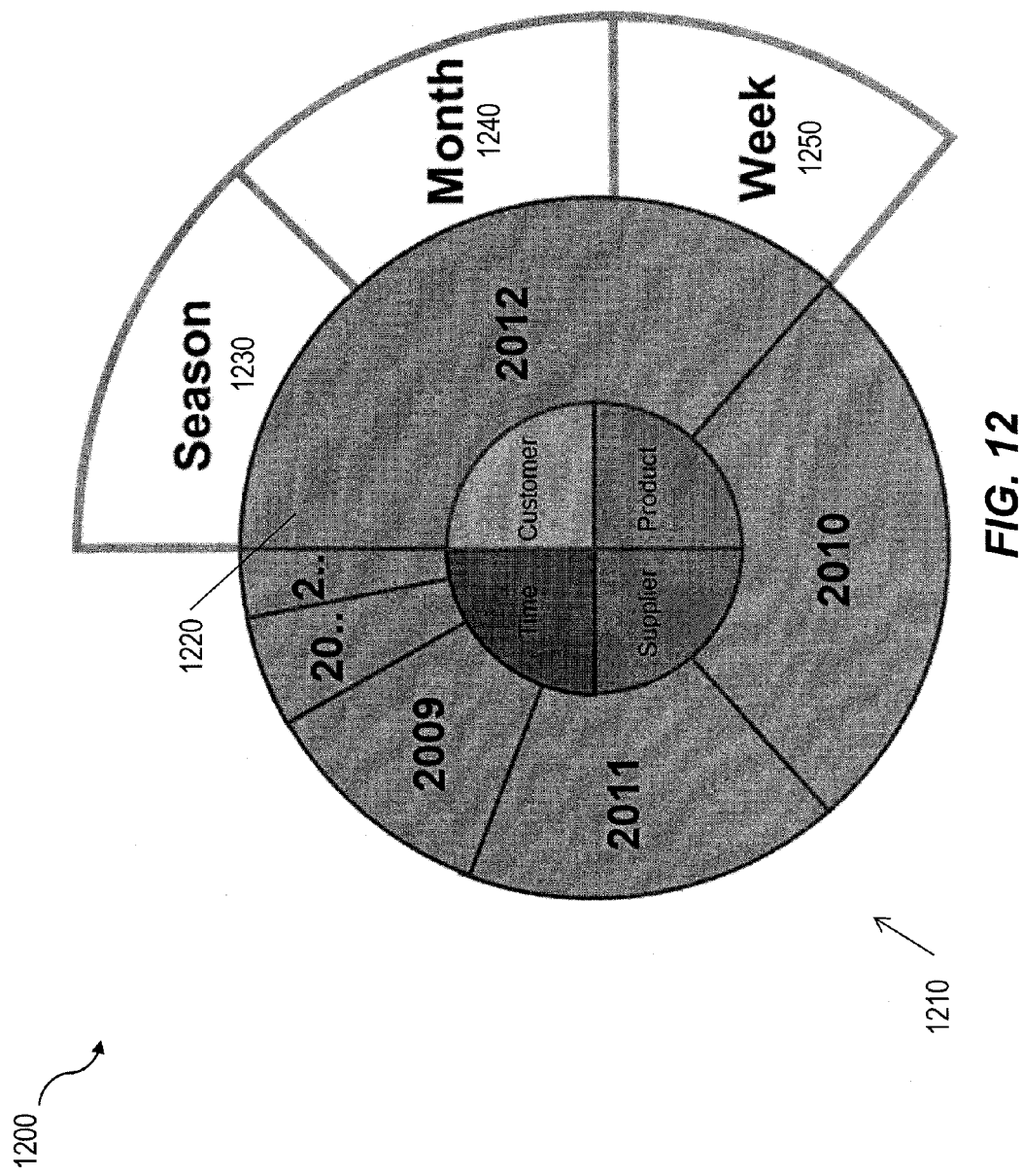
FIG. 12 is a diagram illustrating a dimension selection panel for a non-linear hierarchy.

With reference to diagram 1200 of FIG. 12, a view 1210 is shown that assumes that the analyst is drilling down into the time dimension. After selecting a graphical user interface element 1220 that corresponds to the year 2012 for further drill-down, the respective segment can be extended by the potential navigation paths: season 1230, month 1240, and week 1250.

Further, the approaches of navigating and filtering in the hierarchies can be combined, e.g., by displaying the current dimension levels in the proposed hierarchy chart while drilling down and filtering in the hierarchies. Alternatively or in addition, the hierarchy navigation can be extended by adding filter menus at each level to let the user select the instance data at the individual levels.

Figure 13:
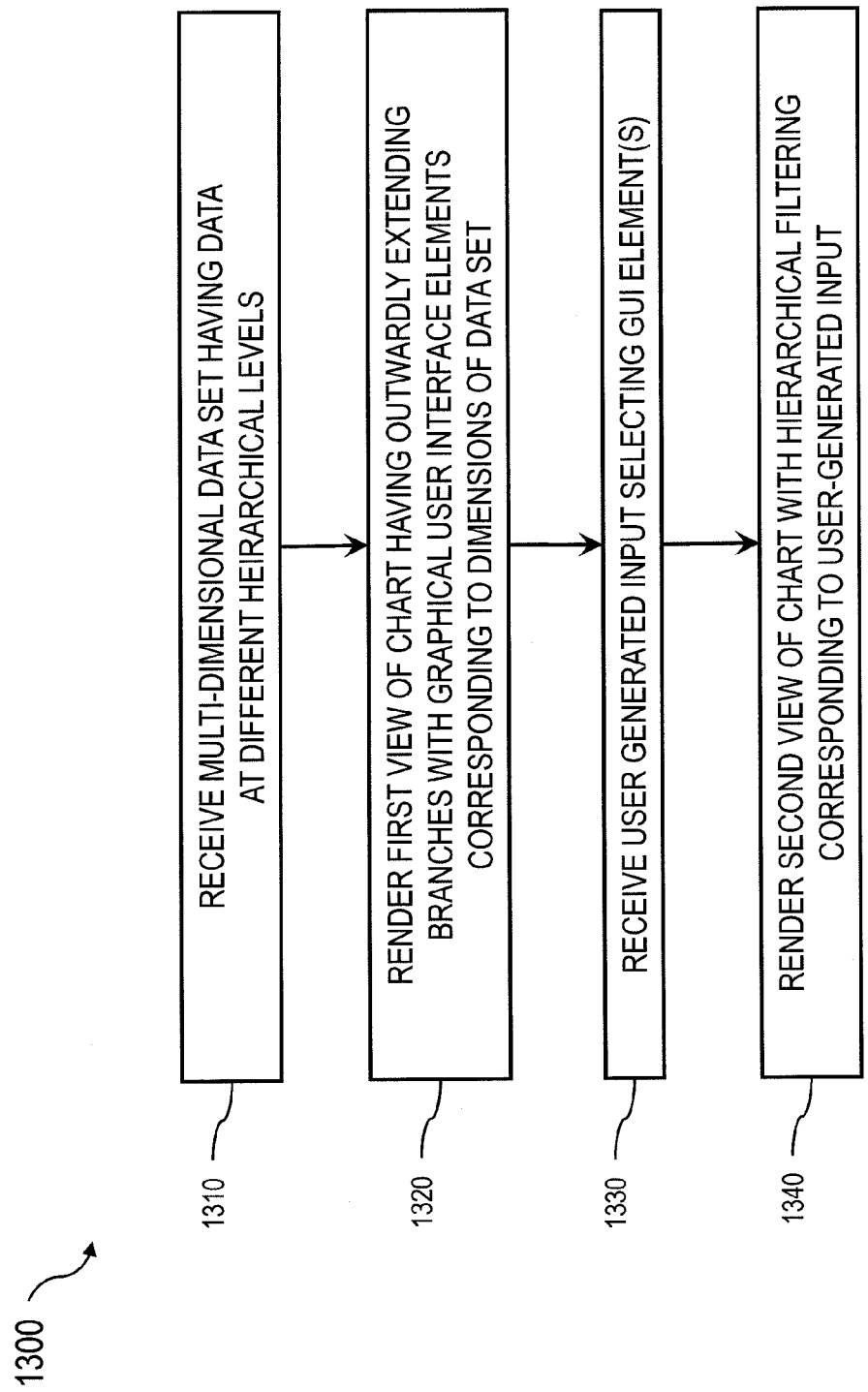
FIG. 13 is a process flow diagram illustrating Visualization and Navigation for Multi-Dimensional Hierarchical Data.

FIG. 13 is a diagram 1300 illustrating a method in which, at 1310, data is received that comprises a multi-dimensional data set having data at different hierarchy levels. Thereafter, at 1320, a first view of the chart can be rendered in a graphical user interface and using the received data. The first view of a chart has a branch corresponding to each dimension within the data set. Each branch extends outwardly from a center point and has graphical indicators corresponding to each corresponding hierarchy level. The hierarchy levels are arranged in order such that a highest hierarchy level is closest to the center point and a lowest hierarchy level is closest to or at a termination point of the corresponding branch. A user can optionally navigate the chart (by selecting one of the GUI elements), at 1330, which causes, at 1340, a second view to be rendered in the graphical user interface with corresponding filtering. Complementary information such as a bar chart corresponding to the navigation can be displayed. In addition a dimension selector and/or dimension selector panel (as described above) can also be displayed in differing views.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. For example, the visualizations and the dimension selector panels can be used independent of each other. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving data comprising a multi-dimensional data set having data at different hierarchy levels;
rendering, in a graphical user interface and using the received data, a first view of a chart having at least a first circle corresponding to a first hierarchy level, the first circle having a plurality of segments, each of first plurality of segments corresponding to a dimension within the first hierarchy level;
receiving an indication to drill down to a second hierarchy level, the indication comprising a selection of a segment from the plurality of segments;
determining, in response to the indication to drill down to the second hierarchy level, that the selected segment corresponds to a first dimension at the first hierarchy level having a non-linear hierarchy, the non-linear hierarchy comprising a first path and a second path, the first path connecting the first dimension at the first hierarchy level to a second dimension at the second hierarchy level, and the second path connecting the first dimension at the first hierarchy level to a third dimension at the second hierarchy level;
rendering, in response to the determination that the segment corresponds to the dimension having the non-linear hierarchy, a second view of the chart in the graphical user interface, the second view of the chart including one or more graphical user interface elements for selecting at least one of the first path and the second path;
in response to the selection of the at least one of the first path and the second path, generating a third view of the chart in the graphical user interface, the third view of the chart including at least a second circle corresponding to the second hierarchy level, the second circle having one or more segments, each of the one or more segments corresponding to at least one of the second dimension and the third dimension, and a size of the first circle being reduced in the second view of the chart in order to display the second circle corresponding to the second hierarchy level in the second view of the chart.

2. The method as in claim 1, further comprising:
rendering, in the graphical user interface, a first view of another chart providing a first graphical user interface element corresponding to the first hierarchy level and a second graphical user interface element corresponding to the second hierarchy level, the second graphical user interface element comprising a visual indicator of the second hierarchy level being currently selected for the drill down, and the first view of the chart or the second view of the chart being rendered in the graphical user interface based at least on a selection of the first graphical user interface element or the second graphical user interface element.

3. The method as in claim 2, wherein the other chart is displayed adjacent to the chart in the graphical user interface.

4. The method as in claim 1, wherein the first circle comprise a different color than the second circle.

5. The method as in claim 1, wherein the one or more graphical user interface elements comprise text labels corresponding to at least one of the second dimension, the third dimension, and the second hierarchy level.

6. The method as in claim 1, further comprising:
receiving, an indication to filter based on a dimension attribute value, the third view of the chart being rendered, based at least on the filter, to include the one or more segments corresponding to at least one of the second dimension and the third dimension.

7. The method as in claim 1, wherein the first circle and the second circle comprise concentric circles, the first circle being nested within the second circle.

8. The method as in claim 6, wherein a size of each of the one or more segments correspond to the dimension attribute value associated with at least one of the second dimension and the third dimension.

9. The method as in claim 7, wherein the dimension attribute value is associated with a different hierarchy level than the second hierarchy level.

10. The method as in claim 1, further comprising:
rendering, in the graphical user interface, a dimension selection panel which comprises one or more dimension selector preview elements, the dimension selector preview elements having corresponding graphical user interface element which, when activated, cause a corresponding dimension selector to be displayed.

11. The method as in claim 1, wherein the receiving and rendering are implemented by at least one data processor forming part of at least one computing system.

12. The method as in claim 1, wherein the second hierarchy level is a higher hierarchy level than the first hierarchy level.

13. The method as in claim 1, wherein the reduction of the first circle comprises collapsing the first circle to accommodate the second circle.

14. The method as in claim 1, further comprising:
receiving another indication to drill down to a third hierarchy level; and
rendering, in response to the other indication to drill down to the third hierarchy level, a fourth view of the chart, the fourth view of the chart including at least a third circle corresponding to the third hierarchy level, and at least one of the size of the first circle and a size of the second circle being reduced in order to display the third circle corresponding to the third hierarchy level in the third view of the chart.

15. The method as in claim 1, wherein the one or more graphical user elements comprise first segment corresponding to the first path and a second segment corresponding to the second path, the first segment and the second segment forming an arc along the selected segment.

16. A non-transitory computer program product storing instructions which, when executed by at least one data processor, result in operations comprising:
receiving data comprising a multi-dimensional data set having data at different hierarchy levels;
rendering, in a graphical user interface and using the received data, a first view of a chart having at least a first circle corresponding to a first hierarchy level, the first circle having a plurality of segments, each of first plurality of segments corresponding to a dimension within the first hierarchy level;
receiving an indication to drill down to a second hierarchy level, the indication comprising a selection of a segment from the plurality of segments;
determining, in response to the indication to drill down to the second hierarchy level, that the selected segment corresponds to a first dimension at the first hierarchy level having a non-linear hierarchy, the non-linear hierarchy comprising a first path and a second path, the first path connecting the first dimension at the first hierarchy level to a second dimension at the second hierarchy level, and the second path connecting the first dimension at the first hierarchy level to a third dimension at the second hierarchy level;
rendering, in response to the determination that the segment corresponds to the dimension having the non-linear hierarchy, a second view of the chart in the graphical user interface, the second view of the chart including one or more graphical user interface elements for selecting at least one of the first path and the second path;
in response to the selection of the at least one of the first path and the second path, generating a third view of the chart in the graphical user interface, the third view of the chart including at least a second circle corresponding to the second hierarchy level, the second circle having one or more segments, each of the one or more segments corresponding to at least one of the second dimension and the third dimension, and a size of the first circle being reduced in the second view of the chart in order to display the second circle corresponding to the second hierarchy level in the second view of the chart.

17. The non-transitory computer program product as in claim 16, wherein the operations further comprise:
receiving, an indication to filter based on a dimension attribute value, the third view of the chart being rendered, based at least on the filter, to include the one or more segments corresponding to at least one of the second dimension and the third dimension.

18. A system comprising:
at least one data processor; and
memory storing instructions which, when executed by the at least one data processor, result in operations comprising:
receiving data comprising a multi-dimensional data set having data at different hierarchy levels;
rendering, in a graphical user interface and using the received data, a first view of a chart having at least a first circle corresponding to a first hierarchy level, the first circle having a plurality of segments, each of first plurality of segments corresponding to a dimension within the first hierarchy level;
receiving an indication to drill down to a second hierarchy level, the indication comprising a selection of a segment from the plurality of segments;
determining, in response to the indication to drill down to the second hierarchy level, that the selected segment corresponds to a first dimension at the first hierarchy level having a non-linear hierarchy, the non-linear hierarchy comprising a first path and a second path, the first path connecting the first dimension at the first hierarchy level to a second dimension at the second hierarchy level, and the second path connecting the first dimension at the first hierarchy level to a third dimension at the second hierarchy level;
rendering, in response to the determination that the segment corresponds to the dimension having the non-linear hierarchy, a second view of the chart in the graphical user interface, the second view of the chart including one or more graphical user interface elements for selecting at least one of the first path and the second path;
in response to the selection of the at least one of the first path and the second path, generating a third view of the chart in the graphical user interface, the third view of the chart including at least a second circle corresponding to the second hierarchy level, the second circle having one or more segments, each of the one or more segments corresponding to at least one of the second dimension and the third dimension, and a size of the first circle being reduced in the second view of the chart in order to display the second circle corresponding to the second hierarchy level in the second view of the chart.

19. The system as in claim 18, wherein the operations further comprise:

receiving, an indication to filter based on a dimension attribute value, the third view of the chart being rendered, based at least on the filter, to include the one or more segments corresponding to at least one of the second dimension and the third dimension.

\* \* \* \* \*